Feb. 10, 1948.   J. NADER   2,435,692
DYNAMOELECTRIC MACHINE
Filed June 21, 1946
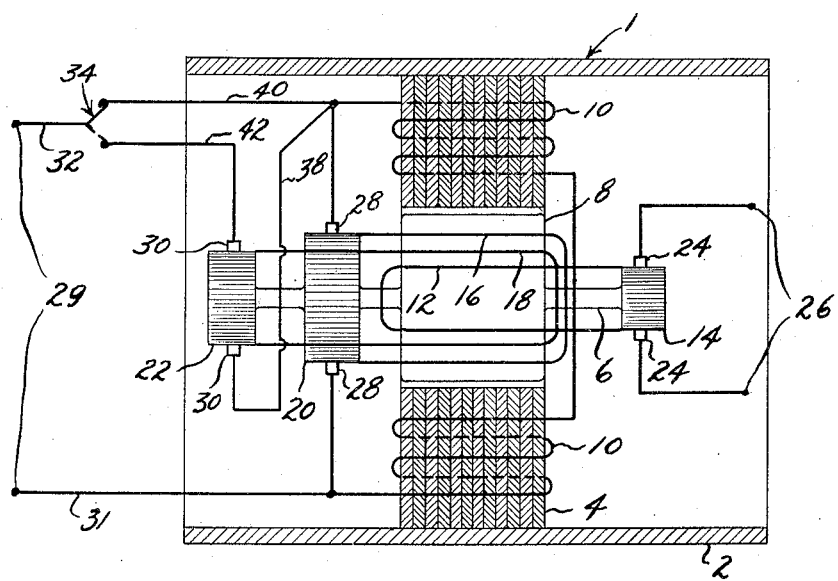
Inventor
JOSEPH NADER
by The Firm of Charles W. Hills   Attys.

Patented Feb. 10, 1948

2,435,692

UNITED STATES PATENT OFFICE 2,435,692

DYNAMOELECTRIC MACHINE

Joseph Nader, Glen Ellyn, Ill., assignor to Nader Engineering Co., Chicago, Ill., a corporation of Illinois Application June 21, 1946, Serial No. 678,210

4 Claims. (Cl. 171—123)

This invention relates to a dynamo-electric machine.

In many applications, and particularly in power supply systems for aircraft radio systems, the problem arises of selectively supplying a relatively high voltage, high wattage load and a low voltage, low wattage load from a single source of power, which generally comprises a low voltage D. C. battery-generator system. In accordance with this invention, a single dynamo-electric machine is provided which, by the operation of a simple switch, will selectively supply a high voltage, high wattage load, such as a radio transmitter, or a low voltage, low wattage load, such as a radio receiver, and which will operate from a single source of power which may conveniently comprise a six or twelve volt D. C. system. Furthermore, such dynamo-electric machine will operate with substantially equal, high efficiency in both load conditions.

Accordingly, it is an object of this invention to provide an improved dynamo-electric machine.

A particular object of this invention is to provide an improved dynamo-electric machine of the dynamotor type so arranged that the single machine will operate from a single source of power and selectively supply at substantially equal, high efficiencies, a high voltage, high wattage load, or a low voltage, low wattage load.

The specific nature of the invention, as well as other objects and advantages thereof will become apparent to those skilled in the art from the following detailed description of the annexed sheet of drawings which, by way of preferred example only, illustrates one specific embodiment of the invention.

On the drawings:

The single figure of the drawing represents a schematic view of a dynamo-electric machine embodying this invention together with a circuit diagram of the necessary electrical connections.

As shown on the drawings:

The numeral 1 indicates generally a dynamo-electric machine embodying this invention. Since such machine is illustrated only in schematic form in the drawings, it is to be understood that the various elements of the machine not described or illustrated in detail constitute conventional arrangements of such elements which are well known in the art.

The dynamo-electric machine 1 comprises a hollow casing 2 within which are mounted, in cooperating relationship, a laminated field structure 4, an armature shaft 6 and an armature structure 8. The field structure 4 and the armature structure 8 are mounted for relative rotative movement in a manner which is well known in the art. A field winding 10 is wound on field structure 4 and such winding may comprise either the well known pole type or the equally well known distributed-field type winding.

A single output winding 12 is wound upon armature structure 8 and is connected in conventional manner to an output commutator 14 which is conveniently mounted upon one end of armature shaft 6. A plurality of armature input windings are also provided upon the armature structure. In the particular example illustrated, two such armature input windings 16 and 18 are provided and are connected in conventional manner to commutators 20 and 22 which are mounted in adjoining relationship upon the other end of armature shaft 6. Brushes 24 are provided which cooperate with output commutator 14 and suitable leads connect the brushes 24 to a pair of output terminals 26. It is to be understood that the load supplied throughout output terminals 26 is preferably of the type which selectively requires either a high voltage, high wattage power input, or a low voltage, low wattage power input. Such load characteristics are commonly found in aircraft radio apparatus which, when in the transmitting condition, require a relatively high voltage and wattage, while in the receiving condition, require a lower voltage and wattage input.

Brushes 28 and 30 are provided which cooperate respectively with input commutators 20 and 22. Suitable leads are provided which connect the field winding 10 in parallel with one of the armature input windings, for example, the winding 16. Numeral 29 represents the terminals of a power supply source and, in the application of this invention to aircraft radio systems, the terminals 29 may represent the output terminals of a six or twelve volt D. C. power system of the aircraft.

A lead 31 connects one input terminal 29 to one side of input commutator 20. A lead 32 provides a connection between the other terminal 29 and the blade of a double-pole switch indicated schematically at 34. The second side of the input commutator 20 is connected through lead 38 to the first side of input commutator 22. Leads 40 and 42 connect respectively between the two poles of switch 34 and the second sides of the input commutators 20 and 22.

From the construction described, it is apparent that when the blade of switch 34 occupies the position indicated in the drawing by the full line, the armature input commutator 22, and hence its associated input winding 18, are disconnected from the power supply source and the field winding 10 and the armature input winding 16 are connected directly across the power supply source. Under such conditions, the armature output winding 12 will generate a relatively high voltage and will supply a high voltage, high wattage load, such as required for operation of an aircraft radio transmitter.

When the switch 34 is operated to move the blade thereof to the position indicated by dotted lines in the drawings, then the armature input winding 18 is connected in series with the armature input winding 16 and accordingly the current flowing through the field winding 10 is substantially reduced, hence reducing the field flux. It should be noted that such reduction is accomplished without the substantial power loss which accompanies field control by a resistor. Under such conditions, the output armature winding 12 will generate a substantially lower voltage and hence may be conveniently utilized to supply a low voltage, low wattage load, such as represented by an aircraft radio receiver, at substantially the same efficiency as attained for the high voltage, high wattage condition.

The output armature winding 12 will, of course, be designed in accordance with the requirements of the high voltage, high wattage load. Likewise, the input armature windings will be designed for the voltage conditions determined by the power supply source. Hence in either condition of operation, there is no possibility of the normal rated load producing excessive voltage or current conditions within any of the windings of the dynamo-electric machine. As an example of an application for which the machine embodying this invention is conveniently adaptable, the armature input winding may be designed to function from a six volt D. C. source and the armature output winding 12 can then be conveniently designed to supply selectively approximately 70 watts at about 325 volts, or approximately 12 watts at 180 volts.

It will, of course, be understood that various details of construction may be varied through a wide range without departing from the principles of this invention and it is, therefore, not the purpose to limit patent granted hereon otherwise than necessitated by the scope of the appended claims.

I claim as my invention:

1. A dynamo-electric machine comprising relatively rotatable, cooperating field and armature structures, a field winding on said field structure, an output armature winding on said armature structure, a plurality of input windings on said armature structure, means connecting said field winding in parallel with one of said input armature windings, and means for selectively energizing said one input armature winding either directly or through a series connection with another armature input winding, whereby said output armature winding will selectively supply a high voltage, high wattage load, or a low voltage, low wattage load.

2. A dynamo-electric machine comprising relatively rotatable, cooperating field and armature structures, a field winding on said field structure, an output armature winding on said armature structure, a plurality of input windings on said armature structure, commutators respectively associated with said input windings, means connecting said field winding across one of said input winding commutators, and means for selectively energizing said one input winding commutator either directly or through a series connection with another of said input winding commutators, whereby said output armature winding will respectively supply a high voltage, high wattage load, or a low voltage, low wattage load.

3. A dynamo-electric machine for selectively supplying at substantially equal efficiency a high voltage, high wattage load, and a low voltage, low wattage load from a single low voltage power source comprising relatively rotatable cooperating field and armature structures, a low voltage field winding on said field structure, a high voltage, high wattage output armature winding on said armature structure, a plurality of low voltage input windings on said armature structure, means connecting said field winding in parallel with one of said input armature windings, and means for selectively energizing said one input armature winding from the low voltage source either directly or through a series connection with another armature input winding.

4. A dynamo-electric machine comprising relatively rotatable, cooperating field and armature structures, a field winding on said field structure, an output armature winding on said armature structure, a pair of input windings on said armature structure, means connecting said field winding in parallel with one of said input armature windings, means adapted for connecting the first side of said one input winding to one side of a D. C. power source, means connecting the second side of said one armature input winding to the first side of said other armature input winding, and a switch adapted to selectively connect either said second side of the said one armature input winding or said second side of the said other armature input winding to the other side of the D. C. power source.

JOSEPH NADER.